(12) United States Patent
Hefny et al.

(10) Patent No.: US 10,929,982 B2
(45) Date of Patent: Feb. 23, 2021

(54) FACE POSE CORRECTION BASED ON DEPTH INFORMATION

(71) Applicant: Google LLC, Mountain View, CA (US)

(72) Inventors: Tarek Hefny, Redmond, WA (US); Humberto Castaneda, Mountain View, CA (US)

(73) Assignee: Google LLC, Mountain View, CA (US)

( * ) Notice: Subject to any disclaimer, the term of this patent is extended or adjusted under 35 U.S.C. 154(b) by 134 days.

(21) Appl. No.: 16/258,348

(22) Filed: Jan. 25, 2019

(65) Prior Publication Data

US 2020/0242778 A1 Jul. 30, 2020

(51) Int. Cl.
G06K 9/34 (2006.01)
G06T 7/194 (2017.01)
G06T 7/50 (2017.01)
G06T 7/13 (2017.01)
G06T 7/70 (2017.01)
G06T 5/00 (2006.01)

(52) U.S. Cl.
CPC .............. *G06T 7/194* (2017.01); *G06T 5/002* (2013.01); *G06T 5/006* (2013.01); *G06T 7/13* (2017.01); *G06T 7/50* (2017.01); *G06T 7/70* (2017.01); *G06T 2207/10016* (2013.01); *G06T 2207/20068* (2013.01); *G06T 2207/30201* (2013.01)

(58) Field of Classification Search
CPC ..... G06F 3/013; G06F 3/012; G02B 27/0093; G02B 2027/014; G02B 2027/0138; G06K 9/4647; G06K 9/4652; G06K 9/32; G06K 9/00268; G06K 2009/363; G06K 9/00281; G06T 2207/30201
See application file for complete search history.

(56) References Cited

U.S. PATENT DOCUMENTS

| | | | | |
|---|---|---|---|---|
| 6,806,898 B1* | 10/2004 | Toyama | .................. | G06T 5/006 348/14.01 |
| 7,515,173 B2* | 4/2009 | Zhang | ..................... | H04N 7/144 348/14.01 |
| 10,080,956 B2 | 9/2018 | Tolk et al. | | |
| 10,171,738 B1 | 1/2019 | Liang et al. | | |
| 2007/0252074 A1* | 11/2007 | Ng | ...................... | G02B 27/0075 250/208.1 |
| 2007/0252674 A1* | 11/2007 | Nelson | .................... | G06T 5/006 340/5.53 |
| 2009/0147141 A1* | 6/2009 | Lee | ..................... | G06K 9/00221 348/576 |

(Continued)

FOREIGN PATENT DOCUMENTS

| WO | WO 2004/107266 | 12/2004 |
|---|---|---|
| WO | WO2016107638 | 7/2016 |
| WO | WO2016176226 | 11/2016 |

OTHER PUBLICATIONS

Kuster et al., Gaze Correction for Home Video Conferencing, Nov. 2012, ACM Transactions on Graphics, vol. 31, No. 6, Article 174, pp. 174:1-174:6.*

(Continued)

*Primary Examiner* — Guillermo M Rivera-Martinez

(74) *Attorney, Agent, or Firm* — IP Spring

(57) ABSTRACT

Some implementations can include a computer-implemented method, computer readable medium, and/or system for pose correction of video images captured by a mobile device.

18 Claims, 7 Drawing Sheets

(56) References Cited

U.S. PATENT DOCUMENTS

| | | | |
|---|---|---|---|
| 2011/0050568 A1* | 3/2011 | Hu | G06T 7/73 345/157 |
| 2011/0090303 A1* | 4/2011 | Wu | H04N 5/23267 348/14.16 |
| 2011/0243388 A1* | 10/2011 | Sakaguchi | G06T 3/4007 382/103 |
| 2011/0244919 A1* | 10/2011 | Aller | G06Q 30/0281 455/556.1 |
| 2012/0038742 A1* | 2/2012 | Robinson | H04N 7/142 348/14.16 |
| 2013/0016097 A1* | 1/2013 | Coene | G06T 7/194 345/419 |
| 2013/0016102 A1* | 1/2013 | Look | G06T 15/20 345/426 |
| 2013/0063538 A1* | 3/2013 | Hubner | H04N 7/142 348/14.02 |
| 2013/0121597 A1* | 5/2013 | Hsu | H04N 5/21 382/201 |
| 2013/0135315 A1* | 5/2013 | Bares | G11B 27/031 345/473 |
| 2015/0002607 A1* | 1/2015 | Border | H04N 21/41407 348/14.02 |
| 2015/0077323 A1* | 3/2015 | Ramaswamy | G06F 3/0304 345/156 |
| 2015/0077573 A1* | 3/2015 | Ishikawa | G06T 3/005 348/189 |
| 2015/0195491 A1* | 7/2015 | Shaburov | H04N 7/15 348/14.12 |
| 2016/0067617 A1* | 3/2016 | Tolk | A63F 13/655 463/32 |
| 2016/0323541 A1* | 11/2016 | Nilsson | H04N 7/141 |
| 2017/0111584 A1* | 4/2017 | Hong | H04N 5/23296 |
| 2017/0214861 A1* | 7/2017 | Rachlin | G03B 5/00 |
| 2017/0236407 A1* | 8/2017 | Rhoads | H04N 5/23219 455/420 |
| 2017/0316602 A1* | 11/2017 | Smirnov | G06T 15/205 |
| 2018/0082405 A1* | 3/2018 | Liang | G06F 3/04842 |
| 2018/0307310 A1* | 10/2018 | McCombe | H04N 5/23229 |
| 2019/0130622 A1* | 5/2019 | Hoover | G06F 3/005 |
| 2020/0045287 A1* | 2/2020 | Varekamp | H04N 13/117 |
| 2020/0103962 A1* | 4/2020 | Burns | G06F 3/011 |

OTHER PUBLICATIONS

"International Search Report and Written Opinion in PCT application No. PCT/US2019/053692", dated Jan. 2, 2020, 9 pages.

"Gaze Correction for Home Video Conferencing", https://www.youtube.com/watch?v=_clOuXPYu-0, Apr. 18, 2016.

* cited by examiner

FACE POSE CORRECTION BASED ON DEPTH INFORMATION

BACKGROUND

Occasionally, when a user is using mobile device (e.g., a mobile phone, tablet, or the like) in a video call, the user may hold or place the mobile device at an angle relative to the face of the user such that it captures the user's image at an unsuitable angle, e.g., a less-than-optimal angle to view the user's expression, an angle that produces an image with facial distortion, etc. For example, a user may hold a mobile phone facing upwards in a way that the phone is pointed at an upward angle toward the user's face, which can capture the user at a less than optimal angle (e.g., looking upward from below the chin and nose) and may cause the face of the user to appear distorted or appear as if the user is not facing the other participants in the call and eye contact may seem lost. Additionally, the user's hand may be shaky and cause jitter in the image being captured for the video call.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to mobile device video calling, and in particular to pose correction of video images captured by a mobile device.

Some implementations include capturing a user's face pose and an eye gaze using a depth camera associated with a user device and performing face pose correction and stabilization of the face pose.

Some implementations can include a computer-implemented method. The method can include receiving a video including a plurality of frames, the video captured by a physical camera at a first point of view, wherein the video includes depth information corresponding to the plurality of frames, and detecting a face within the video, wherein the face is within a foreground portion of one or more frames of the video.

The method can also include determining the foreground portion of the plurality of frames based on one or more depth values of the depth information corresponding to the plurality of frames, and positioning a virtual camera at a second point of view, wherein the second point of view is different from the first point of view. The method can further include obtaining a projection matrix of the foreground portion based on the virtual camera, the projection matrix corresponding to the second point of view, and generating a modified video that includes a modified foreground portion based on the projection matrix.

The method can also include adjusting the projection matrix of the foreground portion to reduce a lens effect of the physical camera used to capture the video. In some implementations, detecting the face can include extracting the face out of a background plane, wherein the background plane is determined based on the depth information. The method can also include rotating the background plane to face the virtual camera at the second point of view.

In some implementations, determining the foreground portion can include detecting the face and a background, and the detecting can include extruding the foreground portion of the face from the background. In some implementations, extruding can include can include detecting face depth based on the depth information, determining a depth within the frames of an outer edge of the face, and setting the background to include portions of the frames at a depth of the outer edge of the face and at depths beyond the outer edge of the face.

The method can also include comprising blurring the background. The method can further include determining a temporal history of depth information of the video. The method can also include comprising providing hysteresis of video re-projection using the temporal history of the depth information of the video so as to maintain continuity of a re-projection and not respond to temporary objects moving in front of the face being re-projected, wherein the temporary objects are in front of the face being re-projected for less than a threshold period of time.

Some implementations can include a system comprising one or more processors coupled to a non-transitory computer readable medium having stored thereon software instructions that, when executed by the one or more processors, cause the one or more processors to perform operations. The operations can include receiving a video including a plurality of frames, the video captured by a physical camera at a first point of view, wherein the video includes depth information corresponding to the plurality of frames, and detecting a face within the video, wherein the face is within a foreground portion of one or more frames of the video.

The operations can also include determining the foreground portion of the plurality of frames based on one or more depth values of the depth information corresponding to the plurality of frames, and positioning a virtual camera at a second point of view, wherein the second point of view is different from the first point of view. The operations can further include obtaining a projection matrix of the foreground portion based on the virtual camera, the projection matrix corresponding to the second point of view, and generating a modified video that includes a modified foreground portion based on the projection matrix. The operations can also include stabilizing the modified foreground portion of the modified video.

The operations can further include adjusting the projection matrix of the foreground portion to reduce a lens effect of the physical camera used to capture the video. In some implementations, detecting the face comprises extracting the face out of a background plane, wherein the background plane is determined based on the depth information.

The operations can also include rotating the background plane to face the virtual camera at the second point of view. In some implementations, determining the foreground portion includes detecting the face and a background, where the detecting can include extruding the foreground portion of the face from the background. In some implementations, extruding can include detecting face depth based on the depth information, determining a depth within the frames of an outer edge of the face, and setting the background to include portions of the frames at a depth of the outer edge of the face and at depths beyond the outer edge of the face.

The operations can also include blurring the background. The operations can further include determining a temporal history of depth information of the video. The operations can also include providing hysteresis of video re-projection using the temporal history of the depth information of the video so as to maintain continuity of a re-projection and not respond to temporary objects moving in front of the face being re-projected, wherein the temporary objects are in front of the face being re-projected for less than a threshold period of time.

Some implementations can include a non-transitory computer readable medium having stored thereon software instructions that, when executed by one or more processors, cause the one or more processors to perform operations. The operations can include receiving a video including a plurality of frames, the video captured by a physical camera at a first point of view, wherein the video includes depth information corresponding to the plurality of frames, and detecting a face within the video, wherein the face is within a foreground portion of one or more frames of the video. The operations can also include determining the foreground portion of the plurality of frames based on one or more depth values of the depth information corresponding to the plurality of frames, and positioning a virtual camera at a second point of view, wherein the second point of view is different from the first point of view.

The operations can further include obtaining a projection matrix of the foreground portion based on the virtual camera, the projection matrix corresponding to the second point of view, and generating a modified video that includes a modified foreground portion based on the projection matrix. The operations can also include stabilizing the modified foreground portion of the modified video. In some implementations, determining the foreground portion can include detecting the face and a background, where the detecting includes extruding the foreground portion of the face from the background.

DETAILED DESCRIPTION

Figure 1:
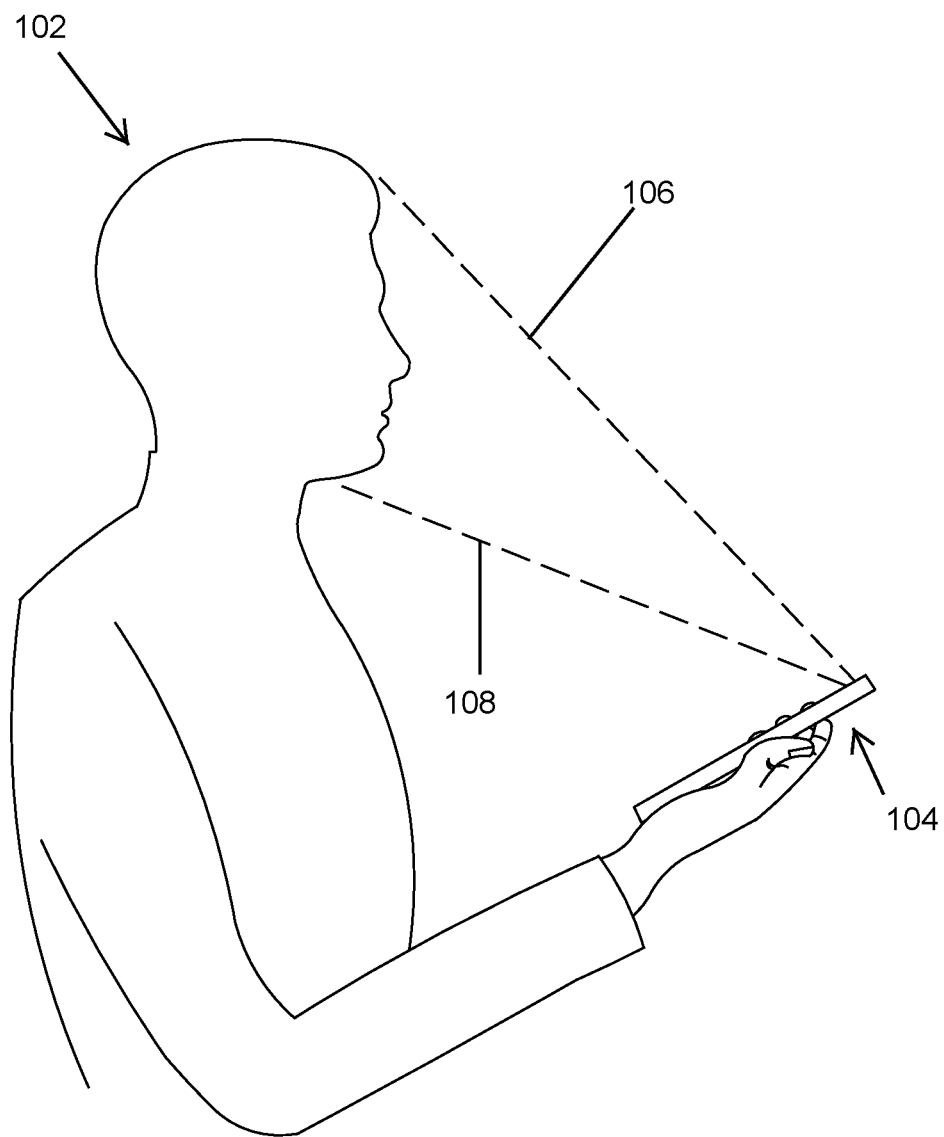
FIG. 1 is a diagram showing an example user device being used to conduct a video call with the user device capturing the user at an angle that may produce a lower quality video.

Some implementations include methods and systems to modify or correct a user pose in a video call or conference. Users may be participating in a video call with a camera at an angle that may produce a lower quality video or moving to such an angle at some point during a call. For example, a user may appear to be looking up in a video based on how the user is holding their phone. Most video calling devices, e.g., smartphones, laptops, tablets, etc. currently include a camera at the top end of the device. Such placement often produces images that are less than optimal for a video call. Images suitable for pose correction by an implementation can include single images such as photos, cinemagraphs and other animated images, videos, etc.

Some implementations can create an adjusted video call presence by re-projecting the video image of the user using a virtual point of view (or virtual camera angle) such that the user appears to be at an angle that produces a corrected pose (e.g., directly facing the camera, etc.). Some implementations can also include correction for camera distortion (e.g., to remove the big nose effect), reduction in the effect of jitter (e.g., caused by user hand movement), etc.

By capturing color and depth information from video frames, an implementation can extrude depth for foreground. The system can place a virtual camera at a different angle than the physical camera of the device (e.g., up to give the effect that others are looking at the user directly).

Some implementations can include three main operations: 1) in-frame face detection; 2) pose correction; and 3) gaze correction. In some implementations, in-frame face detection can include using technology that provides a face pose angle (e.g., a 3D Euler angle) and the position of face in a frame (such as ARKit or ARCore, which are trademarks of their respective owners). The pose angle can include the angle of the face relative to the camera (e.g., looking straight ahead is 0,0,0, and when face is rotated about one of the axes, then the angle corresponding to that axis changes in the 3D Euler angle). The position is the x, y position within the color image, from which the device can determine position relative to the device (e.g., x, y, z position). Extra padding can be added to the frame to provide a buffer. Whenever the face of the user is within a threshold (or safe) range of angle relative to the camera, (e.g., plus or minus about 20 degrees around the x or y axes) the system returns a high confidence value indicating that the face of the user is positioned within a frame of video such that the techniques for pose correction described herein are most likely to be effective. If the image of the user's face is in the padding area, confidence is lower (e.g., indicating that the pose correction techniques described herein may not work as effectively given the user's face position), and decreases as the portion of the face in the padding area increases. No confidence (or a zero or near zero confidence value) is returned if the user is outside of the acceptable range (e.g., the frame and/or padding).

Confidence, reason or basis, and/or guidance to a user can be provided based on the in-frame face detection. As discussed above, confidence indicates a level of confidence that the pose correction technique can be applied effectively to a given face position within a frame of video or other image. Reason or basis can include an indication of why the confidence score may be low (e.g., face too close to a border, etc.). Guidance can include an indication provided by the system (e.g., via a graphical user interface) to help direct the user to correct the issue that has caused a low confidence score. For example, if confidence is low, a reason can be determined and feedback based on the reason can be provided to the user (e.g., a black overshadow that increases in transparency with lower confidence, or a small arrow directing the user to move back in frame, etc.) to help guide the user to change the video capture to increase confidence.

When the image capture device provides depth data, e.g., real time depth data captured using a depth sensor or other hardware of the device, implementations can take into account such data along with the face pose. A camera RGB feed can be represented as a plane that is perpendicular to the camera forward (e.g., a vector pointing out of the lens of the camera in a forward direction toward a subject the camera is capturing) and stretches to fill the base of the view frustum. In some implementations, pose correction can include three operations: background detection, extrusion, and rotation.

In some implementations, background detection can include using depth data to detect or determine the background. There are two main technical problems with background detection using live depth frames: noise and bleeding effect (e.g., halo like artifact due to missing data near the edges). Some implementations provide a solution to the bleeding effect problem by applying a Sobel filter to detect edges of areas that can be treated as background. To address the noise problem, such as spatial or temporal noise, a smoothing algorithm can be used.

A shader can be implemented for the above functionality returning a value in a range (e.g., [0,1]) defining the confidence of whether a given point is background or foreground (thus providing information that can be used for a fade effect around the edges of the foreground portion). The shader can include a per-pixel classifier that executes runs on a GPU instead of a CPU, to achieve efficiency. The shader receives, as input, the color image and produces a foreground/background mask as an output image (e.g., red=foreground and black=background, etc.). Another shader performs the pose correction using the color image, depth image, foreground/background mask, and/or camera intrinsics (e.g., focal length of the camera, and other camera parameters or settings) as input.

Some implementations can include extrusion and rotation of at least a portion of one or more video frames (or other images). The extrusion and rotation can include using smoothed disparity map data. The disparity map data can be applied to the foreground portion of the image (in the camera-plane representation) to move foreground pixels closer to the camera. A disparity map is another way to represent depth data (e.g., representing distance of the device camera to a point).

In some implementations, a virtual camera position is updated to be perpendicular to the face plane in one or more frames (e.g., in the first frame). Updating the virtual camera position can include setting the forward vector of the camera to be the opposite of forward vector of the face anchor. A face anchor includes face position and face rotation angle calculated during face detection. In some implementations, the projection matrix of the camera can be updated to go through the four edges of the image plane using a calculation that is done whenever the device moves and that takes into account a current delta between the face pose and a "front pose" in order to not cancel out intentional face movements. In some implementations, the projection matrix can be maintained for foreground pixels and the projection for background pixels can be skipped to reduce computation time, with a caveat being that foreground pixels are visible. The foreground can be zoomed in to hide any imperfect matches with the background such that the foreground occludes the background and is then enlarged to cover any gaps created by the face rotation.

Some implementations can include background treatments. In some implementations, background treatments can include adjusting the background, which could be stretched due to rotation. In order for the background to not have a distracting appearance, a blurring effect can be used on the background.

The systems and methods provided herein may overcome one or more deficiencies of some conventional video calling systems and methods. For example, some conventional video calling system may not provide a capability to detect, correct or adjust for a camera angle that may contribute to capturing a lower quality video or may cause other problems with video frames such as exaggerated features and/or movement effects. With the easy availability of digital image capture devices, such as digital cameras, phones with built-in cameras, wearable devices with cameras, head-mounted devices, tablets, personal computers, etc., users may frequently capture or transmit video.

The example systems and methods described herein may overcome one or more of the deficiencies of conventional video capture systems to provide users with automatic pose correction of videos or other images. A technical problem of some conventional systems may be that such systems do not detect and correct poses based on image analysis and corresponding confidence scores. The disclosed subject matter relates to particular techniques to correct poses of videos or other images and/or to automatically correct for other video or image issues. Some implementations of the disclosed subject matter provide a solution to one or more of the above-mentioned technical problems. For example, by re-projecting video, some implementations enable high quality video irrespective of camera angle.

Videos are used herein as examples to describe the subject matter. Other types of images could be used with an implementation of the disclosed subject matter. An image may be a static image (e.g., a single frame with no motion), an animated image, a video (e.g., with a plurality of frames), etc. For example, a static image may depict one or more objects, while an animated image may depict one or more objects that change within the image (e.g., a live photo that captures a face with eyes transitioning between closed and open, face with the mouth moving from a non-smiling to a smiling position, etc.) A video may include a plurality of frames that depict one or more persons or objects. Pose correction may be provided for any type of image, and may include a group of images of same and/or different types.

Figure 3:
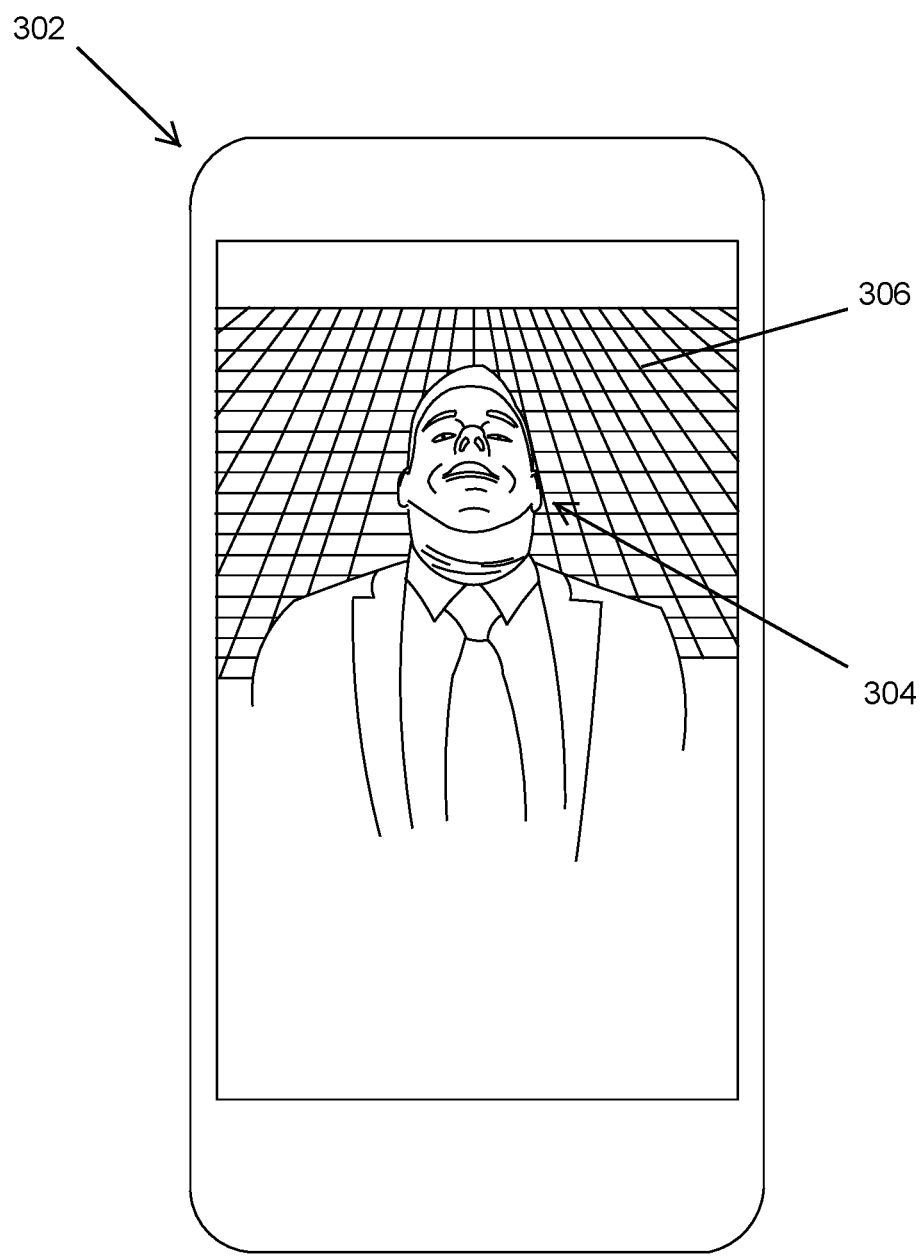
FIG. 3 is a diagram of an example user device showing a video call in which the video was captured at an angle that may produce a lower quality video.

FIG. 1 is a diagram showing an example user 102 using a user device 104 to conduct a video call. The user device 104 is at an angle relative to the user's face that is capturing video of the user at an angle that may produce a lower quality video, such as the example lower quality video frame shown in FIG. 3.

Due to the angle of the user device 104 relative to the face of the user 102, a first distance 106 from the camera to the top of the user's head is different (e.g., longer) than a second distance 108 from a camera of the user device 104 to the bottom of the user's 102 face. A result of the difference in the distances 106 and 108 resulting from the upward angle of the user device 104 creates a pose (e.g., as shown on the device 302 in FIG. 3) that may not provide a high quality video (e.g., may cause distortion, etc.).

In addition to the pose at an angle that may produce a lower quality video, other problems can be introduced in the video such a movement effects (e.g., due to hand movement or jitter by the user 102) and image effects (e.g., the big nose effect) due to the lens of the user device 104. These problems may result from the physical placement of the camera on a user device (e.g., at the top of the device) and from a common posture for holding user devices such as mobile phones or wearable devices, e.g., smartwatch or other device, in which the hand holding the phone (or other device) is at a downward angle relative to the face of the user. In addition to distortion of the foreground portions of the images (e.g., a pose captured at an angle that may produce a lower quality video 304), the camera angle can also result in a background 306 that is distorted.

Figure 2:
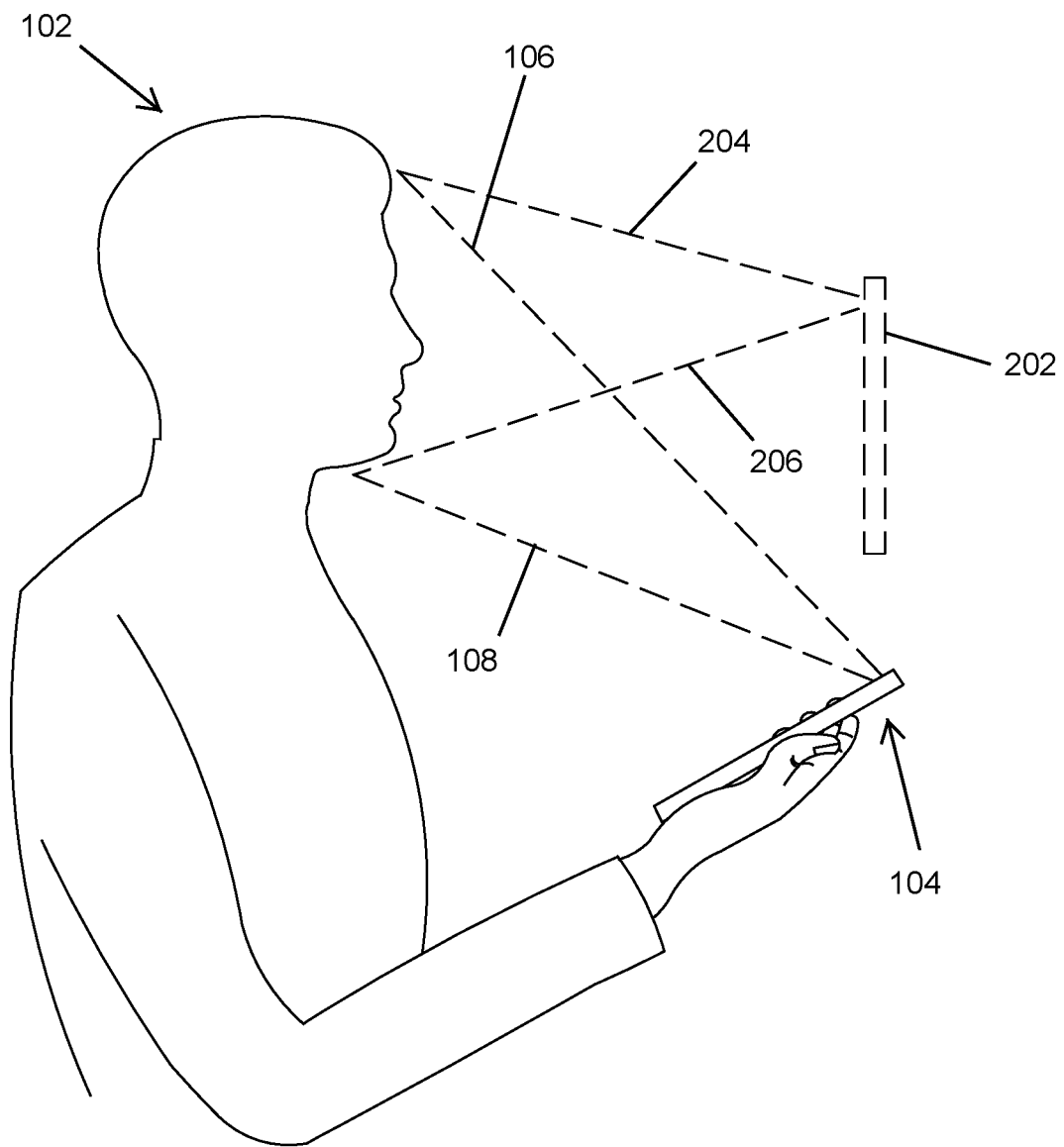
FIG. 2 is a diagram showing an example user device being used to conduct a video call with the user device capturing the user at an angle that may produce a lower quality video and a virtual point of view used to correct the pose of the user to produce a higher quality video in accordance with some implementations.
Figure 4:
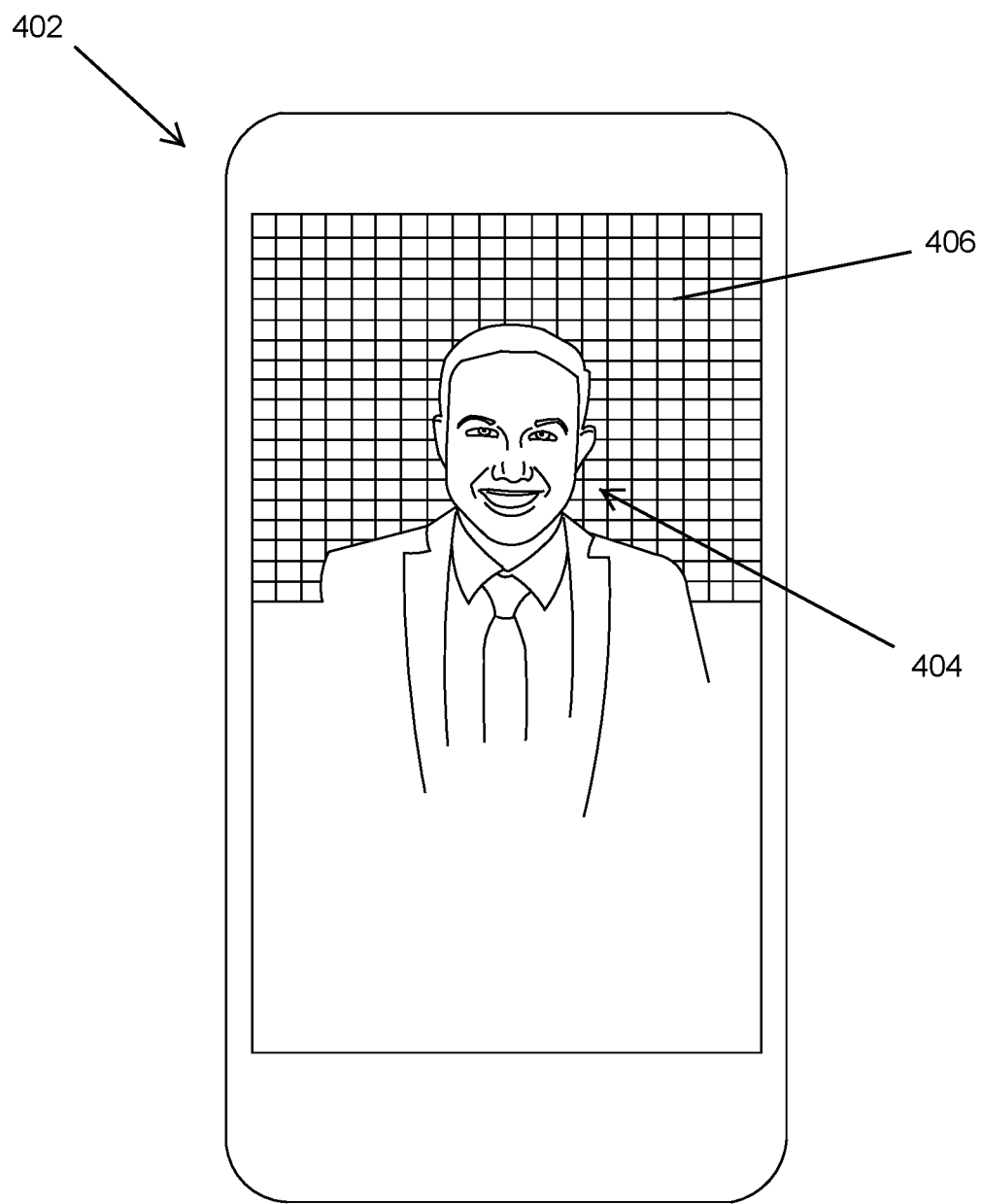
FIG. 4 a diagram of an example user device showing a video call in which the video was re-projected to create a corrected pose and a higher quality video.

FIG. 2 is a diagram showing the example user device 104 being used to conduct a video call with the user device 104 capturing the user 102 at an angle that may produce a lower quality video (e.g., difference in 106 and 108). FIG. 2 also shows a virtual point of view 202 used to re-project the image of the user 102 and correct the pose of the user. The virtual point of view 202 is generally parallel to the face plane of the user 102 (or at least closer to parallel being parallel to the face plane than the user device 104) and results in a first distance 204 from the virtual point of view 202 to the top of the user's 102 face being about the same as a second distance 206 from the virtual point of view 202 to a bottom of the user's 102 face. The virtual point of view can be used to re-project the user's face in the video as described herein to produce an adjusted pose 404 as shown in FIG. 4. In FIG. 4, a device 402 receiving the re-projected video includes an adjusted pose 404 of a user and a background 406 that has been rotated to reduce the distortion compared to the unrotated background 306 in FIG. 3. The virtual point view 202 is in front of the face (e.g., having a same distance from the device to the face, but rotated to be directly in front of the user's face).

Each user device (or client device) can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

A user interface can enable display of images, image compositions, data, and other content as well as communications, privacy settings, notifications, and other data on client devices. Such an interface can be displayed using software on the client device, software on the server device, and/or a combination of client software and server software executing on a server device, e.g., application software or client software in communication with a server system. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, one or more client devices and/or a server system can provide pose correction. The pose correction may allow a system (e.g., client device or server device) to automatically provide pose correction for videos with capture problems, some examples of which are described herein. The pose correction systems and methods can provide a corrected video to one or more associated user interface(s) that are displayed on a display device associated with a client device receiving the corrected video. Other applications can also be used with one or more features described herein, such as image management applications, browsers, communication applications, etc.

Various implementations of features described herein can use any type of system and/or service. For example, social networking services, image collection and sharing services, assisted messaging services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 5:
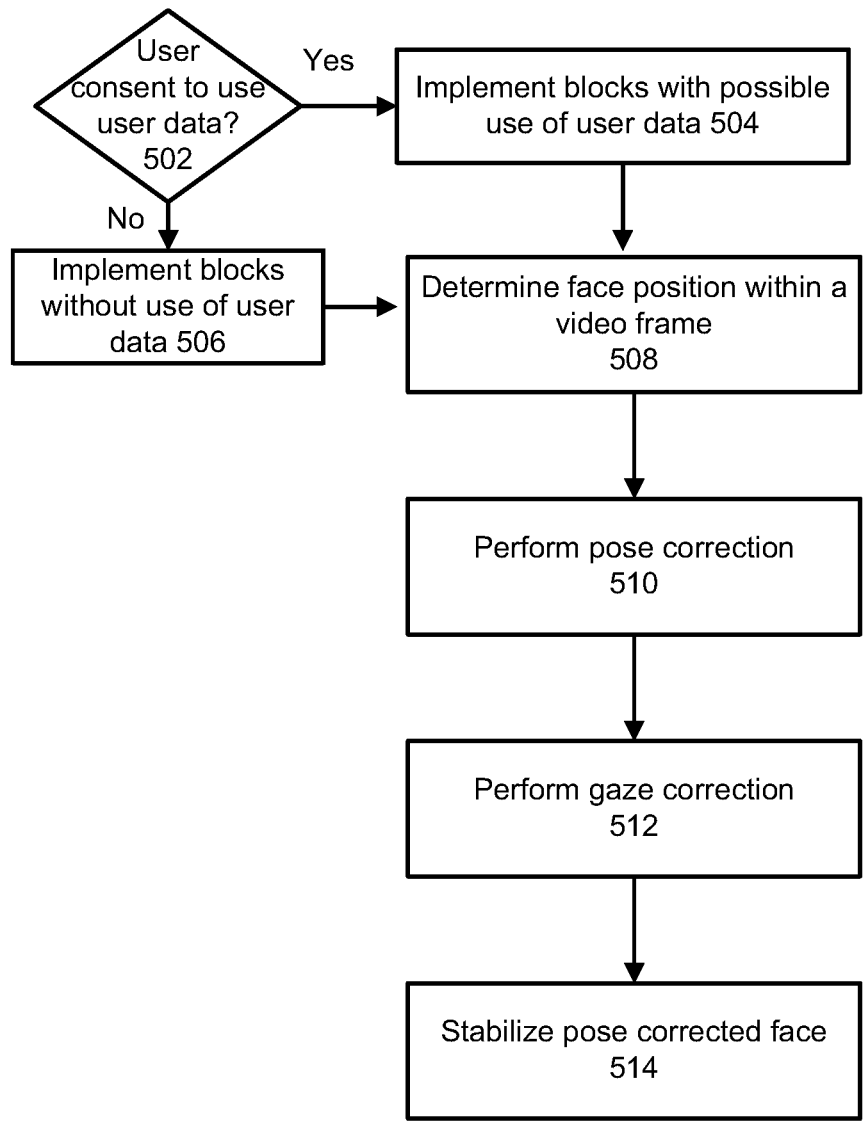
FIG. 5 is a flowchart of an example method for pose correction in accordance with some implementations.

FIG. 5 is a flowchart of an example method 500 for pose correction in accordance with some implementations. In some implementations, method 500 can be implemented, for example, on a client device, one or more server devices, and/or on both server device(s) and client device(s). In described examples, the implementing system includes one or more digital hardware processors or processing circuitry ("processors"), and one or more storage devices. In some implementations, different components of one or more client devices and/or server devices can perform different blocks or other parts of the method 500.

Some implementations can initiate method 500 based on user input. A user may, for example, have selected the initiation of the method 500 from a displayed user interface. In some implementations, method 500 or portions thereof can be performed with guidance by the user via user input.

In some implementations, the method 500, or portions of the method, can be initiated automatically by a device. For example, the method (or portions thereof) can be performed based on the occurrence of one or more particular events or conditions. For example, such events or conditions can include a user participating video call having a camera angle that may produce a lower quality video, and/or one or more other events or conditions occurring which can be specified in settings of a device implementing method 500.

In block 502, it is checked whether user consent (e.g., user permission) has been obtained to use user data in the implementation of method 500. For example, user data can include user video or images. One or more blocks of the methods described herein may use such user data in some implementations (e.g., for face detection and/or pose correction). Block 502 may be performed as part of a sharing suggestion framework and/or to verify consent provided at the functional image archiving suggestion framework level such that blocks 504 and on will only be invoked if user consent for performing the functional image archiving suggestions was obtained at the functional image archiving suggestion framework level. If user consent has been obtained from the relevant users for which user data may be used in the method 500, then in block 504, it is determined that the blocks of the methods herein can be implemented with possible use of user data as described for those blocks, and the method continues to block 506. If user consent has not been obtained, it is determined in block 506 that blocks are to be implemented without use of user data, and the method continues to block 506. In some implementations, if user consent has not been obtained, the remainder of method 500 is not performed, and/or particular blocks needing the user data are not performed.

At 508, face position within a video frame is determined. Determining face position can include receiving a video including a plurality of frames, the video captured by a physical camera (e.g., a camera in device 104) at a first point of view. In some implementations, the video can include depth information for one or more of the plurality of frames. Determining face position can also include detecting a face within the video, wherein the face is within a foreground portion of one or more frames of the video. In some implementations, face detection can be performed using known techniques for detection of faces. Processing continues to 510.

At 510, pose correction is performed. Pose correction can include re-projecting the face and/or background within the video to create an adjusted face pose and/or to reduce lens effects or other image distortions. Pose correction is described in detail below in connection with FIG. 6. Processing continues to 512.

At 512, gaze correction is optionally performed on the pose corrected video. Gaze correction can include altering the eye portion of the face within the video to correspond to the pose correction applied at 504. Processing continues to 514.

At 514, the pose corrected face is optionally stabilized. Stabilization can include applying an inverse transformation based on movement of the user device as a transformation to stabilize the face pose. For example, the stabilization may only consider user device movement and not consider movement of the face between different frames of the video.

In some implementations, blocks 502-514 can be performed. In other implementations a subset of blocks 502-514 can be performed. For example, blocks 508 and 510 are performed. In another implementation, blocks 508, 510, and 514 are performed. In yet another implementation, blocks 508, 510 and 512 are performed. In the implementations described above, the blocks may be performed in a different order (e.g., 510 and 508; 514, 510, and 508; or 512, 510, and 508, etc.).

Stabilization can also include determining a temporal history of depth information of the video (e.g., a time series of depth information as captured in different video frames captured across a given period of time) and using the temporal history of depth information to provide hysteresis (or a defined lag) for the video re-projection. The hysteresis can be used to maintain continuity of a re-projection such that the pose correction method does not respond to (e.g., include in the re-projection) any temporary objects moving in front of the face being re-projected. For example, temporary objects moving in front of the face (e.g., a user's hand or other object) can include objects detected or being re-projected for less than a threshold period of time. The lag provided by the hysteresis of the video re-projection can be sufficient (e.g., equal to or greater than the threshold period of time) to exclude from re-projection the temporary objects so that the re-projected video does not get disrupted by the temporary object passing in front of or near the face being re-projected.

In FIG. 5, various blocks (e.g., blocks 502-514) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

Figure 6:
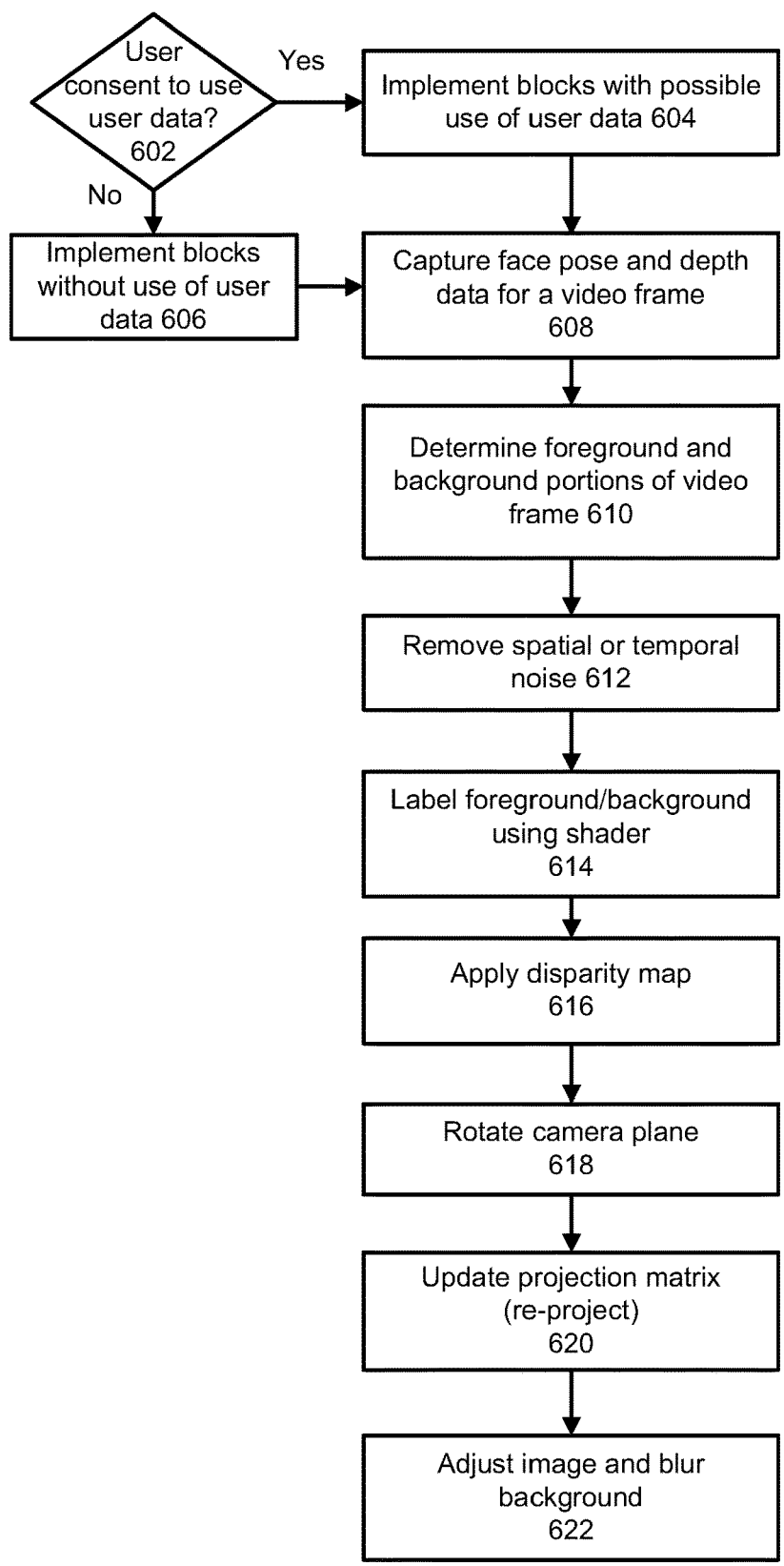
FIG. 6 is a flowchart of an example method for pose correction in accordance with some implementations.

FIG. 6 is a flowchart of an example method 600 for pose correction in accordance with some implementations. In some implementations, method 600 can be implemented, for example, on a client device, one or more server devices, and/or on both server device(s) and client device(s). In described examples, the implementing system includes one or more digital hardware processors or processing circuitry ("processors"), and one or more storage devices. In some implementations, different components of one or more client devices and/or server devices can perform different blocks or other parts of the method 600.

Some implementations can initiate method 600 based on user input. A user may, for example, have selected the initiation of the method 600 from a displayed user interface. In some implementations, method 600 or portions thereof can be performed with guidance by the user via user input.

In some implementations, the method 600, or portions of the method, can be initiated automatically by a device. For example, the method (or portions thereof) can be performed based on the occurrence of one or more particular events or conditions. For example, such events or conditions can include a user participating video call with a camera angle that may produce a lower quality video, and/or one or more other events or conditions occurring which can be specified in settings of a device implementing method 600.

In block 602, it is checked whether user consent (e.g., user permission) has been obtained to use user data in the implementation of method 600. For example, user data can include user video or images. One or more blocks of the methods described herein may use such user data in some implementations (e.g., for face detection and/or pose correction). Block 602 may be performed as part of a sharing suggestion framework and/or to verify consent provided at the functional image archiving suggestion framework level such that blocks 604 and on will only be invoked if user consent for performing the functional image archiving suggestions was obtained at the functional image archiving suggestion framework level. If user consent has been obtained from the relevant users for which user data may be used in the method 600, then in block 604, it is determined that the blocks of the methods herein can be implemented with possible use of user data as described for those blocks, and the method continues to block 606. If user consent has not been obtained, it is determined in block 606 that blocks are to be implemented without use of user data, and the method continues to block 606. In some implementations, if user consent has not been obtained, the remainder of method 600 is not performed, and/or particular blocks needing the user data are not performed.

At 608, a video or portion of a video is received, where the video includes a plurality of frames. The video can be captured by a physical camera (e.g., a camera in device 104) at a first point of view. The video can include a live video being captured by a user device for transmitting to one or more other devices. One or more frames of video can be initially received, followed by one or more additional video frames. Pose correction can be performed on a frame by frame basis of the video being captured. In some implementations, one or more of the video frames include depth information. Depth map and disparity map data can be obtained from a depth sensor. The depth sensor can be any suitable depth sensor. A face can be detected within the video and the face can include a pose captured an angle that may be causing distortion or a generally lower quality video. The unflattering pose can be determined by the rotation in the face detection (e.g., face pose angle) as discussed above. In some implementations, the system may detect intentional head rotation (e.g., nodding, etc.) and not correct for intentional rotation. The face pose and depth information can captured in real-time or near real-time. Processing continues to 610.

At 610, foreground and background portions of video frame are determined. For example, some implementations can include determining the foreground portion of the plurality of frames based on one or more depth values of the depth information corresponding to the plurality of frames. Determining foreground and background portions can also include applying a Sobel filter (or other edge detection technique) to detect edges. Edges may be background or foreground. In some implementations, a heavier smoothing operation may be applied to the edges, which may include foreground and background, compared to non-edges to address two problems: 1) the depth data is a bumpy map and smoothing is needed to help make a smoother connection between various depth points; and 2) at the edges a heavier smoothing is needed to help better blend around the edges, where depth data may not be reliable and is smoothed heavier to reduce any artifacts at the edges.

In some implementations, detecting the face can include extracting the face out of a background plane, wherein the background plane is determined based on the depth information. In some implementations, the face can be within a foreground portion of one or more frames of the video. In some implementations, determining the foreground portion can include detecting the face and a background, where the detecting includes extruding the foreground portion of the face from the background.

In some implementations, detecting the face and the background can include detecting extruding, which can include face depth based on the depth information, determining a depth within the frames of an outer edge of the face, and setting the background to include portions of the frames at a depth of the outer edge of the face and at depths beyond the outer edge of the face. Processing continues to 612.

At 612, noise, such as spatial or temporal noise, is removed. For example, in some implementations, a smoothing algorithm can be applied to remove spatial and/or temporal noise in one or more of the video frames (or images). Processing continues to 614.

At 614, foreground/background and background portions are optionally identified and labeled using shader. For example, the user device can implement a shader technique that returns a value (e.g., in range of [0,1], for example) to define a point in the image as either a background portion or foreground portion. In some implementations, step 614 can be implemented by shader (and GPU), and 608 can be implemented by CPU. Processing continues to 616.

At 616, a disparity map is applied. For example, in some implementations, disparity map data is applied to the foreground portion of the image to identify a camera-plane representation (e.g., the camera-plane that the face pose is facing). Processing continues to 618.

At 618, the camera-plane determined in 616 is rotated. For example, the camera-plane can be rotated from a first orientation (e.g., the one original being captured by the camera) to a second orientation (e.g., a virtual camera orientation in which the camera-plane and the face plane are generally parallel such that it appears that the camera is directly in front of the face). In some implementations, rotation can include setting a forward vector of the camera to be opposite to a forward vector of the face pose. Rotation can also include rotating the background plane to face the virtual camera at the second point of view. The face tracker provides a transform (e.g., position and face pose angle or rotation) for a given frame of video or image, in a coordinate space that may be different than the device coordinate space or virtual camera coordinate space. First, an angle and 2-D position are calculated out of the transform. The angle is transferrable to any coordinate system. The projection matrix is applied to the transform to determine where the face is in the 2-D image. This gives a position and rotation that are usable in the device coordinates. An angle that is the smaller of the actual angle or a limit angle (e.g., 20 degrees) is applied to each axis of the forward vector. Next, a face forward vector e.g., a vector where the face is looking at, is determined by multiplying the rotation by forward (e.g., 0,0,1) to get the face forward vector. To calculate the virtual camera position, the system can calculate a current distance between the camera and face and multiply by the face position and add distance times face forward. Knowing the camera virtual position and that the camera should look opposite to face forward. The view transform can be calculated. The view transform can be calculated based on an up direction (e.g., based on gravity) and a forward direction (e.g., from the camera location toward the face opposite the face forward vector). Taking the cross product of up and forward produces the left vector. The view transform can then be determined based on forward, left and position. Processing continues to 620.

At 620, a projection matrix of one or more video frames is updated (or re-projected) based on the camera-plane rotation. For example, the view transform can be supplied to a renderer shader along with the projection, color image, depth image, camera intrinsic, and foreground background map. For every foreground pixel, the position is calculated and the projection matrix is applied to re-project the foreground pixels of the image and correct the pose. The background pixels are applied in the same 2-D position as the original image (or frame) with a higher Z value to permit the foreground to occlude the background. Processing continues to 622.

At 622, the re-projected image is optionally adjusted and the background is optionally blurred. For example, the image plane can be stretched to cover the whole view of the face pose and the background can be blurred (e.g., in order to reduce emphasis on the background, which may have been distorted during rotation). In some implementations, the foreground can be zoomed in to cover any gaps (e.g., blank areas produced by the rotation). In some implementations, updating a projection matrix of the camera can include re-projecting a video frame to go through the four edges of the image plane.

In FIG. 6, various blocks (e.g., blocks 602-622) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

As mentioned above, for method 500 or 600, it can be checked whether user consent (e.g., user permission) has been obtained to use user data (e.g., videos) in the implementation of one or both of the methods 500 or 600. For example, user data can include user preferences, user videos, user images, etc. One or more blocks of the methods described herein may use such user data in some implementations. For example, one or bore blocks may be performed as part of pose correction such that those blocks and continuing blocks will only be invoked if user consent for performing the pose correction was obtained. If user consent has been obtained from the relevant users for which user data may be used in the method, then it is determined that the blocks of the methods herein can be implemented with possible use of user data as described for those blocks. If user consent has not been obtained, the method as a whole may not be performed, and/or particular blocks needing the user data may not be performed.

Some implementations can process video frame by frame at a user device and apply pose correction the frame is sent to the video call service. Thus, the technique described herein provides a pose correction that may not affected by error, interruptions or interference with the video call. In some implementations, a depth image of the user could be used to help perform pose correction of the user and to fill in any areas where the depth map acquired by the user device may have hidden areas or gaps.

Some implementations can ignore objects briefly blocking the face of the user, predict where the face would be using historical data, perform pose correction based on the prediction, and then restore to normal pose correction operation function when the object moves. In some implementations, when an object is in front of the face of a user, the pose correction can fade out the correction and not rely on historical data.

In some implementations, the depth image can include a vector of floating point values, a projection (original or virtual camera) can include a 4×4 matrix that maps the cones of camera to a cube including a mapping of position and orientation (forward, up, and back).

In some implementations, when two or more faces are present in video frames, an implementation can be configured to separate the two (or more) users and treat as two (or more) foregrounds. In some implementations, if two (or more) users are detected then the pose correction can be backed out.

In some implementations, objects on the face can be accommodated by the pose correction technique described herein. For example, glasses and hats can be handled. Theoretically, any object on the face or in front of the face can be an issue for pose correction. The objects on the face of a user can be handled by greater smoothing of depth data and, if holes (e.g., areas of face that are occluded but would be visible after correction) are detected, then the system backs out the pose correction. Backing out the pose correction can include reducing the amount of correction being applied. For example, a maximum limit can be initially 20 degrees. To back out the pose correction, the 20 degrees is gradually reduced to 0 degrees. To smoothly re-apply the effect, the 0 degrees can be gradually increased back to 20.

In some implementations, the system can adjust correction angle based on movement of the device (e.g., to compensate for movement of the device during the video call). In some implementations, if holes (e.g., areas of face that are occluded but would be visible after correction) are detected then pose correction is not applied. Implementations can be used to correct poses in security cameras or other cameras. Some implementations can be used to create a parallax effect based on the user on the other side of the call.

Figure 7:
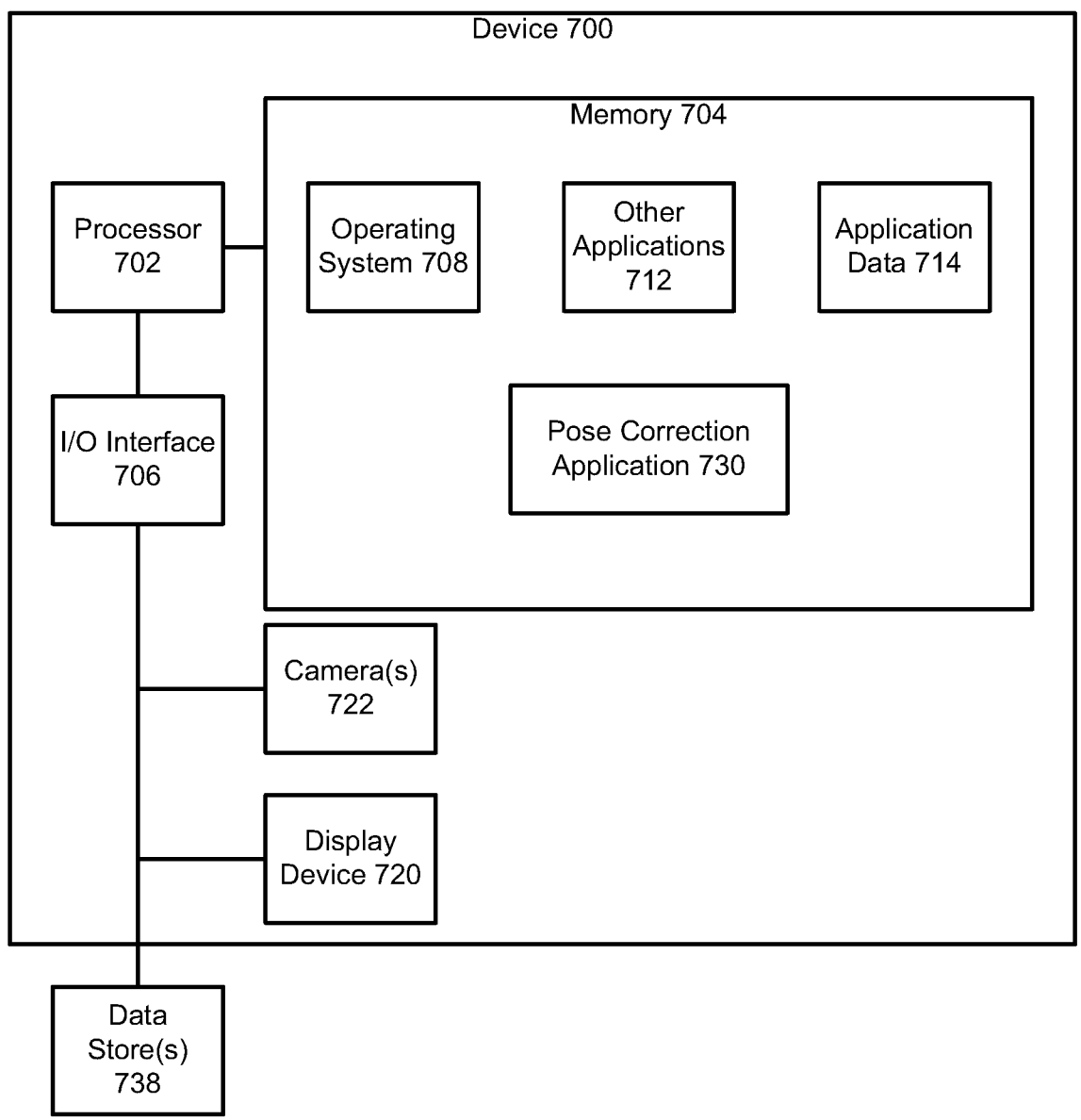
FIG. 7 is a diagram of an example computing device configured for pose correction in accordance with some implementations.

FIG. 7 is a block diagram of an example device 700 which may be used to implement one or more features described herein. In one example, device 700 may be used to implement a user device, e.g., user devices 104, 302, 402, shown in FIGS. 1, 3, and 4, respectively. Alternatively, device 700 can implement a server device. In some implementations, device 700 may be used to implement a client device, a server device, or a combination of the above. Device 700 can be any suitable computer system, server, or other electronic or hardware device for implementing one or more of the systems and/or methods described above.

One or more methods described herein (e.g., 500 and/or 600) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 700 includes a processor 702, a memory 704, and I/O interface 706. Processor 702 can be one or more processors and/or processing circuits to execute program code and control basic operations of the device 400. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 702 may include one or more co-processors that implement neural-network processing. In some implementations, processor 702 may be a processor that processes data to produce probabilistic output, e.g., the output produced by processor 702 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 702 and/or integrated therewith. Memory 704 can store software operating on the device 700 by the processor 702, including an operating system 708, pose correction application 730, other applications 712, and application data 714. Other applications 712 may include applications such as a data display engine, web hosting engine, image display engine, notification engine, social networking engine, etc. In some implementations, the pose correction application 730 and other applications 712 can each include instructions that enable processor 702 to perform functions described herein, e.g., some or all of the methods of FIGS. 5 and/or 6. Any of software in memory 704 can alternatively be stored on any other suitable storage location or computer-readable medium. Memory 704 and any other type of storage (magnetic disk, optical disk, magnetic tape, or other tangible media) can be considered "storage" or "storage devices."

I/O interface 706 can provide functions to enable interfacing the device 700 with other systems and devices. Interfaced devices can be included as part of the device 700 or can be separate and communicate with the device 700. For example, network communication devices, storage devices, and input/output devices can communicate via I/O interface 706. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 706 can include one or more display devices 720, one or more cameras 722, and one or more data stores 738 (as discussed above). The display devices 720 that can be used to display content, e.g., a user interface of an output application as described herein. Display device 720 can be connected to device 700 via local connections (e.g., display bus) and/or via networked connections and can be any suitable display device. Display device 720 can include any suitable display device such as an LCD, LED, or plasma display screen, CRT, television, monitor, touchscreen, 3-D display screen, or other visual display device. For example, display device 720 can be a flat display screen provided on a mobile device, multiple display screens provided in a goggles or headset device, or a monitor screen for a computer device. The camera device(s) 722 can include one or more cameras (or image capture devices) to capture images and/or depth information about a scene being captured in an image (e.g., depth information can include a value for each pixel (or group of pixels) that represents a distance of the object represented by the pixel(s) from the camera.

The I/O interface 706 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 7 shows one block for each of processor 702, memory 704, I/O interface 706, and software blocks 708, 712, and 730. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While some components are described as performing blocks and operations as described in some implementations herein, any suitable component or combination of components of device 700, similar systems, or any suitable processor or processors associated with such a system, may perform the blocks and operations described.

In addition to handheld devices mentioned above as examples, other implementations can include conference room cameras that may be mounted higher and produce a pose from an angle above the user. Some implementations can include pose correction for users sitting at a sideways angle to the camera (e.g., where distortion is caused by left/right side angles and not up/down angles). Some implementations can include pose correction for cameras that are held too close to the user's face.

In some implementations, a caller or called party can turn pose correction on or off, or request that pose correction be performed. In some implementations, pose correction be manually or automatically turned off for other reasons, e.g., battery life, processor capability, etc.

One or more methods described herein (e.g., method 500 or 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Due to the nature of generating a corrected pose, implementations discussed herein may require access to user data such as videos, images, etc. In situations in which certain implementations discussed herein may collect or use personal information about users (e.g., user video or image data), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed (e.g., the sharing suggestion system may anonymously identify important people by features other than personally identifiable information such as name or user name). As one example, a user's identity may be treated so that no personally identifiable information can be determined. As another example, a user's geographic location or a location associated with user images may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A method comprising:
   receiving a video including a plurality of frames, the video captured by a physical camera at a first point of view, wherein the video includes depth information corresponding to the plurality of frames;
   detecting a face within the video, wherein the face is within a foreground portion of the plurality of frames, and wherein detecting the face includes determining that an angle of the face about one or more axes is within a threshold range; and
   in response to detecting the face:
      determining the foreground portion of the plurality of frames based on one or more depth values of the depth information corresponding to the plurality of frames;
      positioning a virtual camera at a second point of view, wherein the second point of view is different from the first point of view;
      obtaining a projection matrix of the foreground portion based on the virtual camera, the projection matrix corresponding to the second point of view; and
      generating a modified video that includes a modified foreground portion based on the projection matrix.

2. The method of claim 1, further comprising adjusting the projection matrix of the foreground portion to reduce a lens effect of the physical camera used to capture the video.

3. The method of claim 1, wherein detecting the face further comprises extracting the face out of a background plane, wherein the background plane is determined based on the depth information.

4. The method of claim 3, further comprising rotating the background plane to face the virtual camera at the second point of view.

5. The method of claim 1, wherein determining the foreground portion includes detecting a background, and wherein the detecting the background includes extruding the foreground portion of the face from the background.

6. The method of claim 5, wherein detecting the background includes:
   detecting face depth based on the depth information;
   determining a depth within the frames of an outer edge of the face; and
   setting the background to include portions of the frames at the depth of the outer edge of the face and at depths beyond the outer edge of the face.

7. The method of claim 6, further comprising blurring the background.

8. The method of claim 1, further comprising:
   determining a temporal history of depth information of the video; and
   performing hysteresis of video re-projection using the temporal history of the depth information of the video so as to maintain continuity of a re-projection and not respond to temporary objects moving in front of the face being re-projected, wherein the temporary objects are in front of the face being re-projected for less than a threshold period of time.

9. A system comprising:
   one or more processors coupled to a non-transitory computer readable medium having stored thereon software instructions that, when executed by the one or more processors, cause the one or more processors to perform operations including:
   receiving a video including a plurality of frames, the video captured by a physical camera at a first point of view, wherein the video includes depth information corresponding to the plurality of frames;
   detecting a face within the video, wherein the face is within a foreground portion of the plurality of frames of the video, and wherein detecting the face includes determining that an angle of the face about one or more axes is within a threshold range; and
   in response to detecting the face:
      determining the foreground portion of the plurality of frames based on one or more depth values of the depth information corresponding to the plurality of frames;
      positioning a virtual camera at a second point of view, wherein the second point of view is different from the first point of view;
      obtaining a projection matrix of the foreground portion based on the virtual camera, the projection matrix corresponding to the second point of view;
      generating a modified video that includes a modified foreground portion based on the projection matrix; and
      stabilizing the modified foreground portion of the modified video.

10. The system of claim 9, wherein the operations further comprise adjusting the projection matrix of the foreground portion to reduce a lens effect of the physical camera used to capture the video.

11. The system of claim 9, wherein detecting the face further comprises extracting the face out of a background plane, wherein the background plane is determined based on the depth information.

12. The system of claim 11, wherein the operations further include rotating the background plane to face the virtual camera at the second point of view.

13. The system of claim 9, wherein determining the foreground portion includes detecting a background, and wherein the detecting the background includes extruding the foreground portion of the face from the background.

14. The system of claim 13, wherein detecting the background includes:
   detecting face depth based on the depth information;
   determining a depth within the frames of an outer edge of the face; and setting the background to include portions of the frames at the depth of the outer edge of the face and at depths beyond the outer edge of the face.

15. The system of claim 14, wherein the operations further comprise blurring the background.

16. The system of claim 9, wherein the operations further comprise:
    determining a temporal history of depth information of the video; and
    performing hysteresis of video re-projection using the temporal history of the depth information of the video so as to maintain continuity of a re-projection and not respond to temporary objects moving in front of the face being re-projected, wherein the temporary objects are in front of the face being re-projected for less than a threshold period of time.

17. A non-transitory computer readable medium having stored thereon software instructions that, when executed by one or more processors, cause the one or more processors to perform operations including:
    receiving a video including a plurality of frames, the video captured by a physical camera at a first point of view, wherein the video includes depth information corresponding to the plurality of frames;
    detecting a face within the video, wherein the face is within a foreground portion of the plurality of frames of the video, and wherein detecting the face includes determining that an angle of the face about one or more axes is within a threshold range; and
    in response to detecting the face:
        determining the foreground portion of the plurality of frames based on one or more depth values of the depth information corresponding to the plurality of frames;
        positioning a virtual camera at a second point of view, wherein the second point of view is different from the first point of view;
        obtaining a projection matrix of the foreground portion based on the virtual camera, the projection matrix corresponding to the second point of view;
        generating a modified video that includes a modified foreground portion based on the projection matrix; and
        stabilizing the modified foreground portion of the modified video.

18. The non-transitory computer readable medium of claim 17, wherein determining the foreground portion includes detecting a background, and wherein the detecting the background includes extruding the foreground portion of the face from the background.

* * * * *